US010037598B2

(12) United States Patent
Gur et al.

(10) Patent No.: US 10,037,598 B2
(45) Date of Patent: Jul. 31, 2018

(54) MULTI-BLOCK MEMORY READS FOR IMAGE DE-WARPING

(71) Applicant: Intel Corporation, Santa Clara, CA (US)

(72) Inventors: Amit Gur, Ein-Vered (IL); Rakefet Kol, Haifa (IL); Edwin Van Dalen, Eindhoven (NL); Tamir Klein, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 15/363,870

(22) Filed: Nov. 29, 2016

(65) Prior Publication Data

US 2018/0150943 A1 May 31, 2018

(51) Int. Cl.

| | |
|---|---|
| ***H04N 5/32*** | (2006.01) |
| ***G06T 5/00*** | (2006.01) |
| ***G06T 3/00*** | (2006.01) |
| ***G06T 11/60*** | (2006.01) |
| ***G06K 9/46*** | (2006.01) |

(52) U.S. Cl.

CPC ........... *G06T 5/006* (2013.01); *G06K 9/4604* (2013.01); *G06T 3/0093* (2013.01); *G06T 11/60* (2013.01)

(58) Field of Classification Search

CPC ............................. H04N 5/3572; G06T 5/006

USPC ...................................................... 348/222.1

See application file for complete search history.

(56) References Cited

U.S. PATENT DOCUMENTS

2017/0347044 A1* 11/2017 Douady-Pleven ... H04N 5/3572

* cited by examiner

*Primary Examiner* — Joel Fosselman

(74) *Attorney, Agent, or Firm* — Green, Howard & Mughal LLP

(57) ABSTRACT

Techniques related to multi-block memory reads for image de-warping are discussed. Such techniques may include copying pixel data corresponding to overlapping regions of memory between adjacent image modification regions from a local buffer and retrieving pixel data corresponding to non-overlapping regions from external memory.

24 Claims, 9 Drawing Sheets

MULTI-BLOCK MEMORY READS FOR IMAGE DE-WARPING

BACKGROUND

Image and video frame warping (or de-warping) provide operations that change the geometry of an image or frame to provide lens distortion correction (LDC), digital video stabilization (DVS), or the like. Such de-warping may use a sparse grid that represents a translation of an original input image to a corrected output image. For example, pixels within tetragons of the input image (as defined by the sparse grid) may be translated to a rectangle of the output image such that the rectangle represents the corrected image.

It may be advantageous to provide such image or frame de-warping efficiently in terms of memory bandwidth and power consumption.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
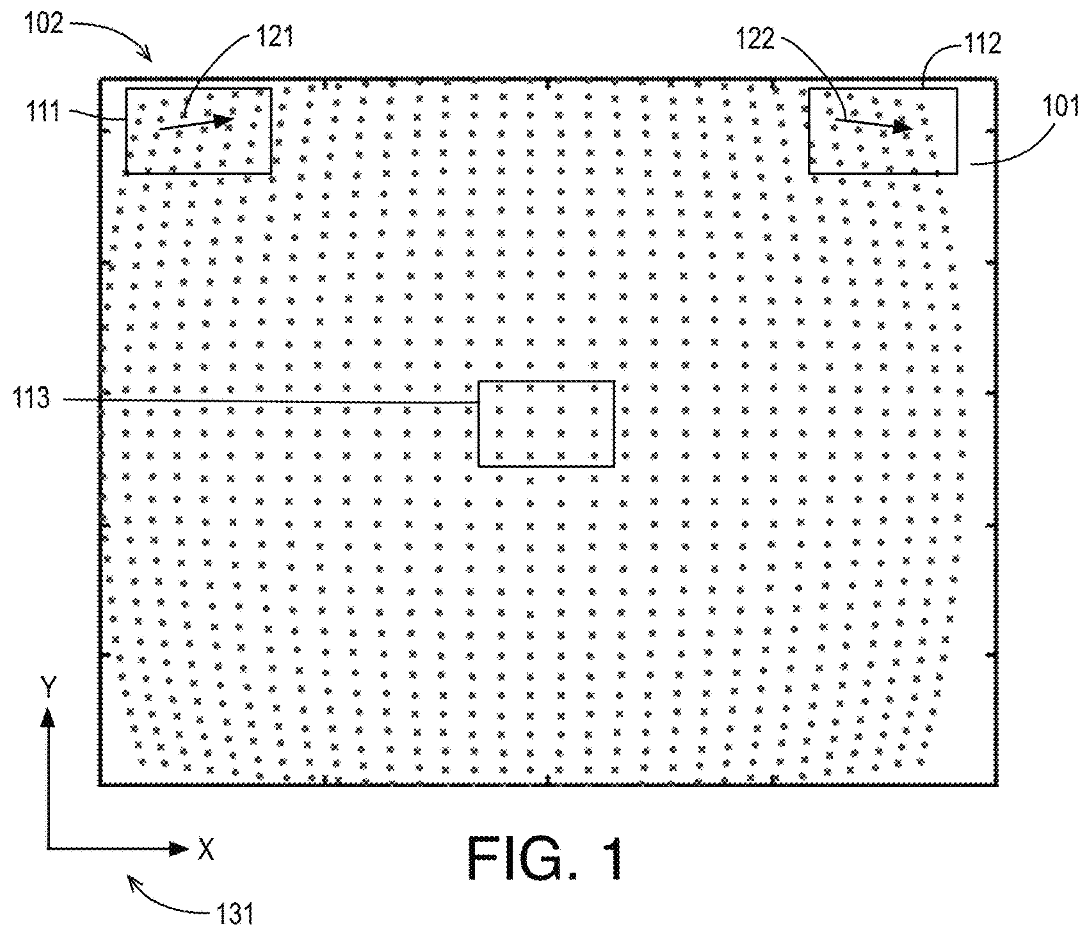
FIG. 1 is an illustration of an example sparse grid for image or frame de-warping over an example input image.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to image or frame de-warping and, in particular, to multi-block reads of pixel data from memory for de-warping operations.

As described above, in de-warping images or video frames to provide, for example, lens distortion correction (LDC), digital video stabilization (DVS), or the like, a sparse grid representing a translation of an original (uncorrected) input image to a corrected output image may be used. Pixels within shapes such as tetragons or the like as defined by the sparse grid may be translated to corrected shapes such as rectangles to provide the corrected output image. Such translation may include translating output pixel values based on input pixel values corresponding to the tetragons as well as a filter support region surrounding the tetragons to support pixel interpolation. Prior to de-warping, the pixel values of an input image (or portion thereof) may be stored in memory such as dynamic random access memory (DRAM) in a raster order, line-by-line with DRAM memory reads to access the pixel data being limited to reads full cache lines. The techniques discussed herein may optimize such memory accesses for image or frame de-warping using multi-block reads and/or internal copying of memory regions retrieved for previous blocks.

In some embodiments, input image pixel data may be stored to memory. An image modification region may be determined for the input image. For example, an image modification region may include pixel locations corresponding to a tetragon of a sparse grid for image de-warping plus pixel locations required for filter support for the tetragon. In some examples, the image modification region may include pixel locations for two or more grouped tetragons (e.g., multiple blocks in a group of blocks) and corresponding filter support. For example, tetragons may be combined with the number of tetragons being combined responsive to the local distortion of the sparse grid at the current block or image modification region being interpolated. For a current image modification region of the input image, a corresponding memory region may be determined such that the corresponding memory region stores the pixel data corresponding to the described image modification region. The current memory region may be compared to a previous memory region (e.g., the memory region corresponding to the previously processed image modification region) to determine an overlapping region of the memory, if any. If an overlapping region exists, the pixel data corresponding to the overlapping region may be internally transferred (e.g., between buffers as is discussed further herein) or internally retained (in a local bovver) without accessing the memory. Such elimination of memory transactions may reduce memory bandwidth and power consumption.

For non-overlapping regions of the memory corresponding to the pixel values of the image modification region, the pixel data may be retrieved from the (external) memory. The pixel data for the non-overlapping regions may be retrieved based on ordered (e.g., temporally ordered) memory access commands that are ordered with respect to a direction corresponding to a spatial direction of the current image modification region. For example, if the current image modification region as defined by the sparse grids has a direction moving upward with respect to translation across the grid (e.g., from left to right across the image), the memory access commands may also be ordered to retrieve pixel data from memory regions in a corresponding direction. For example, since the pixel data of the input image may be stored in a raster order in the memory, the memory and sparse grid may have a corresponding directionality. By providing the memory access commands in such an order corresponding to the spatial direction of the image modification region, the memory accesses may encounter fewer page misses and the like and thereby provide greater efficiency.

FIG. 1 is an illustration of an example sparse grid 102 for image or frame de-warping over an example input image 101, arranged in accordance with at least some implementations of the present disclosure. As shown in FIG. 1, sparse grid 102 may include multiple grid points that may represent or provide a translation of input image 101 to a corrected output image. For example, the grid points of sparse grid may define a sampling pattern in input image 101 such that pixel values of the input image may be interpolated and translated to a normalized pattern to provide a distortion corrected output image. In the example of FIG. 1, input image 101 is simply shown as a blank white image for the sake of clarity of presentation. As will be appreciated, input image 101 may include any suitable image content. As shown, input image 101 and sparse grid 102 may be in an image coordinate system 131 that corresponds to an image capture orientation and/or image presentation orientation of input image 101. Sparse grid 102 may correspond to an image capture device (e.g., camera and/or image capture pipeline) used to capture input image 101. For example, sparse grid 102 may correspond to a camera lens or lenses, to a dynamically measured image or video stabilization distortion, or the like such that distortion may be removed from input image 101. However, sparse grid 102 may be generated using any techniques such that a desired warping or de-warping is provided for input image 101. Also as shown, input image 101 and/or sparse grid 102 may have regions 111, 112, 113 and directional vectors 121, 122, which are discussed further herein below.

As discussed, sparse grid may be used to translate input image 101 to a corrected or warped output image. For example, geometric distortion correction techniques or the like may take pixel values or pixel data from input image 101 within each tetragon defined by the grid points of sparse grid 102 and output a rectangle of the corrected image.

Figure 2:
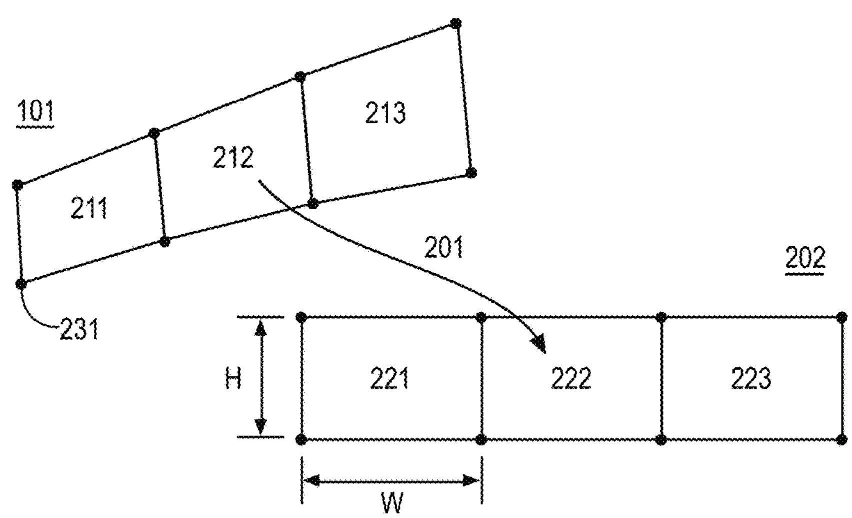
FIG. 2 is an illustration of an example interpolation from tetragons of an input image to rectangles of an output image.

FIG. 2 is an illustration of an example interpolation 201 from tetragons of input image 101 to rectangles of an output image 202, arranged in accordance with at least some implementations of the present disclosure. As shown in FIG. 2, example tetragons 211, 212, 213 may be formed such that each tetragon is defined or represented by four grid points such as grid point 231 of sparse grid 102 (i.e., such that each corner of tetragons 211, 212, 213 is a grid point of sparse grid 102). Based on the pixel data of input image 101 and the geometries defined by tetragons 211, 212, 213, interpolation and translation may be performed to generate rectangles 221, 222, 223 of a corrected output image 202. In the illustrated examples, the sampling shapes of sparse grid 102 are tetragons and the corrected output shapes of output image 202 are rectangles having a shared height H and a width W. However, the sampling shapes of sparse grid 102 may be any suitable shape such as three, four, five, or more cornered shapes and the output shapes of output image 202 may be any suitable corresponding shapes such as equilateral triangles, rectangles or squares, regular pentagons, and so on.

Figure 3:
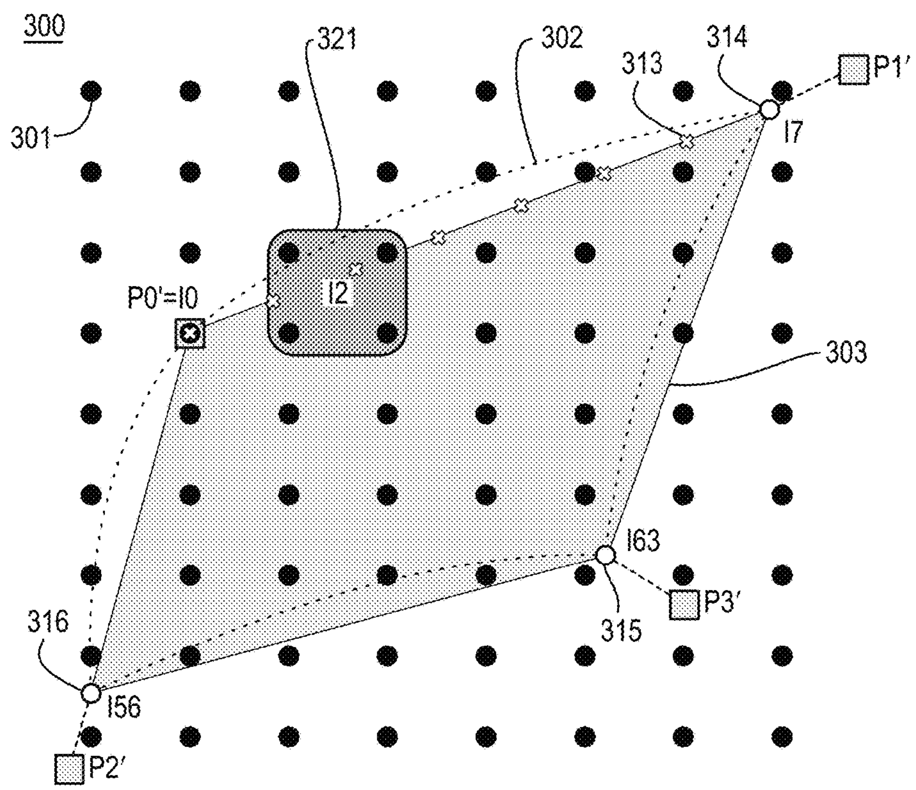
FIG. 3 is an illustration of an example de-warping including filter support.

FIG. 3 is an illustration of an example de-warping 300 including filter support, arranged in accordance with at least some implementations of the present disclosure. Although discussed with respect to de-warping 300, the techniques discussed with respect to FIG. 3 may provide warping or any other image modification. As shown in FIG. 3, de-warping 300 may warp input pixels 301 of input image 101, by interpolation and translation based on the geometry of tetragon 302, as defined by tetragon points P0', P1', P2', and P3' from sparse grid 102, to generate pixel values at pixel locations such as pixel location 313, pixel location 314 and all unlabeled pixel locations of output shape 303. For example, output shape 303 may have 64 pixel locations and corresponding pixel values after interpolation. Although illustrated with 64 pixel locations, output shape 303 may include any suitable number of pixel locations. In an embodiment, output shape 303 has 64 or 128 pixels in the substantially horizontal direction and 32 pixels in the substantially vertical direction. After interpolation, output shape 303 may then be transposed or translated into a rectangular shape such as a rectangle to provide the pixel values of an output image.

In FIG. 3, the pixel values of output shape 303 are illustrated as follows. The top left corner of output shape 303 falls on an input pixel of input pixels 301 (i.e., a black dot), is labeled as P0' as the top left corner of tetragon 302 (and provided a shaded square), and is labeled I0 as an interpolated pixel value (and provided a shaded X). Other corners of the pixel values of output shape 303 are labeled with circles such as top right corner pixel location 314, which is also labeled I7 as an interpolated pixel value, bottom right corner pixel location 315, which is labeled interpolated pixel value I63, and bottom left pixel location 316, which is labeled interpolated pixel value I56. The remainder of the top row of pixel locations of output shape 303 are labeled with Xs and correspond to interpolated pixel values I1-I6 (with only pixel location I2 being labeled for the sake of clarity). Remaining pixel values of output shape 303 are not shown but may include seven additional rows of pixel locations distributed evenly within output shape 303 and having corresponding pixel values to fill in all of interpolated pixel values I0-I63.

In de-warping 300, locations of the output pixels of output shape 303 may be determined, and corresponding output pixel values may be interpolated. For example, the pixel locations of output shape 303 may be determined by distributing them evenly within tetragon 302. To perform interpolation, a filter 321 such as an interpolation filter may be provided. For example, filter 321 is shown generating pixel value I2 corresponding to a pixel location of output shape 303. Any appropriate interpolation filter and/or technique method may be used, including, for example, nearest neighbor interpolation (e.g., selecting nearest pixel), bilinear interpolation (e.g., using a 2×2 window of input pixels 301 and interpolating the output pixel value), bi-cubic interpolation, a look-up table, a poly-phase filter (e.g., with 64, 128, 256, etc., phases), configurable filter sizes, adaptive filter coefficients, or the like. In the illustrated example, a 2×2 filter 321 is illustrated. However, filter 321 may be any size such as 3×3, 4×4, 5×5, 6×6, or the like. As will be appreciated, such larger filter sizes may require larger filter support around tetragon 302 to generate pixel values for output shape 303. In the context of de-warping 300, the pixel locations and corresponding pixel values required to generate output shape 303 may be characterized as a region of interest of input image 101, an image modification region, or the like. Furthermore, pixel values of a region of interest or image modification region or the like of an input image may be stored in a corresponding region of memory.

Figure 4:
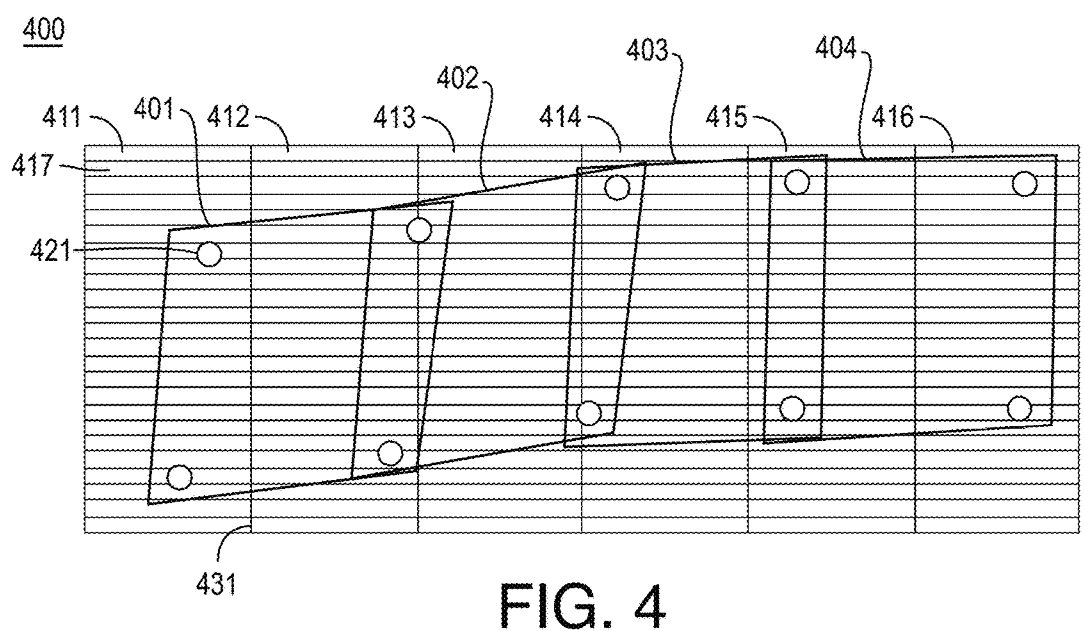
FIG. 4 illustrates an example memory storing pixel values of an input image.

FIG. 4 illustrates an example memory 400 storing pixel values of an input image, arranged in accordance with at least some implementations of the present disclosure. Memory 400 may be any suitable memory such as static memory, dynamic memory, storage, or the like. In an embodiment, memory 400 is dynamic random access memory. As shown in FIG. 4, memory 400 may include cache lines 411-417 (and so on) separated by cache line boundaries such as cache line boundary 431. As will be appreciated, FIG. 4 illustrates a portion of memory 400 such that cache lines 411-417 may be adjacent and successive in order while cache line 417 is not successive with respect to cache line 416. Each cache line such as cache line 411 may store a predetermined amount of data such as 64 bytes of data or the like. An input image such as input image 101 may be stored in memory 400 in a raster order and line by line. For example, each cache line may store pixel values for 32 pixels, 64 pixels, or the like depending on the size of the cache line, the bit depth of the pixel values, and so on. In the context of accessing memory 400, to access any portion of a cache line (e.g., a single pixel value or the like) the entirety of the cache line must be accessed and the corresponding bandwidth and power costs apply. Furthermore, accesses of memory 400 may be made such that each access may retrieve the data within a 2-dimensional region of memory 400. For example, square or rectangular portions of memory 400 may be accessed with a single memory access command by defining a top left cache line and a bottom right cache line for the memory access.

As shown conceptually in FIG. 4 by overlaying regions of interest 401, 402, 403, 404 over memory 400, pixel data corresponding to the discussed regions of interest is stored in corresponding regions of memory 400. For example, cache lines storing pixel data corresponding to region of interest 401 are overlaid by region of interest 401. In the illustration of FIG. 4, tetragon points such as tetragon point 421 are illustrated with filled circles and correspond to tetragon points P0', P1', P2', and P3' from sparse grid 102. As discussed herein, regions of interest 401, 402, 403, 404 may include pixel positions and values of an input image encompassed by the tetragon points and the required filter support for de-warping interpolation. Also as discussed, regions of interest 401, 402, 403, 404 may be about 64 or 128 pixels in the horizontal direction and about 32 pixels in the vertical direction (plus pixels for filter support). In FIG. 4, the horizontal dimension of the overlay of regions of interest 401, 402, 403, 404 over memory 400 in the horizontal direction may be illustrated approximately accurately based on 64 pixels in the horizontal and 64 byte cache lines. However, the illustrated cache lines in the vertical direction would be about 32 cache lines in contrast to the illustrated about ten cache lines, which is provided for the sake of clarity of presentation.

As discussed further herein, to process an input image to a corrected output image, image modification regions of the input image may be iteratively processed to generate corresponding modified regions of an output image. In some examples, such image modification regions may each include a single region of interest 401, 402, 403, 404, and so on. In other examples, an image modification region may include a grouping of any number of regions of interest 401, 402, 403, 404.

Figure 5:
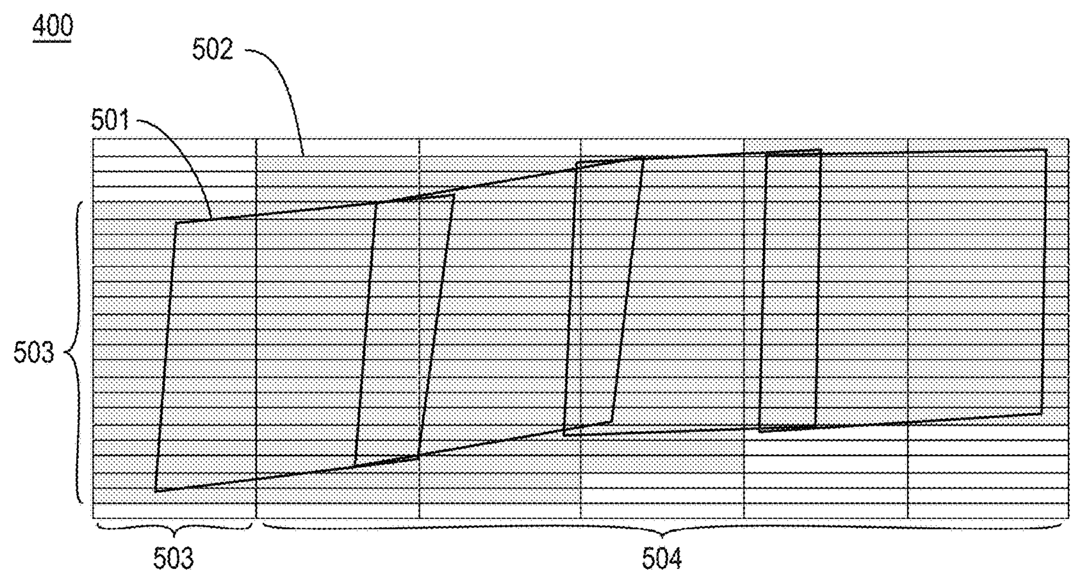
FIG. 5 illustrates an example image modification region including a grouping of regions of interest.

FIG. 5 illustrates an example image modification region 501 including a grouping of regions of interest 401, 402, 403, 404, arranged in accordance with at least some implementations of the present disclosure. As shown in FIG. 5, image modification region 501 is a grouping of regions of interest 401, 402, 403, 404 such that pixel values for image modification region 501 may be retrieved together at a particular memory retrieval iteration. FIG. 5 illustrates a grouping of four regions of interest. However, any number of regions of interest may be grouped such as two to eight regions of interest or more. As discussed herein, such grouping may not be performed in some embodiments. Furthermore, such regions of interest may also be characterized as blocks and a group or grouping of regions of interest may be characterized as a group of blocks. FIG. 5 also illustrates a region of memory 502 storing pixel data corresponding to image modification region 501. For example, region of memory 502 may include all of those cache lines overlapped by image modification region 501. As discussed, region of memory 502 may include all the pixel values required to de-warp the tetragons of image modification region 501 as well as additional unneeded pixel values that are attained when accessing those cache lines that include both needed and unneeded pixel values.

As shown in FIG. 5, region of memory 502 may also include an overlapping region 503 such that overlapping region 503 overlaps the region of memory corresponding to a previously processed image modification region (not shown). As discussed further herein, the pixel data corresponding to overlapping region 503 may have been previously retrieved from memory 400 and stored in a local buffer for processing of the previous image modification region. Such pixel data may be locally available for copying to another local buffer for the current image modification region (thus avoiding external memory commands). Pixel data corresponding to a non-overlapping region 504 (e.g., the pixel data in region of memory 502 not in overlapping region 503) may be retrieved to the local buffer from memory 400 using external memory access commands to access memory 400.

Figure 6:
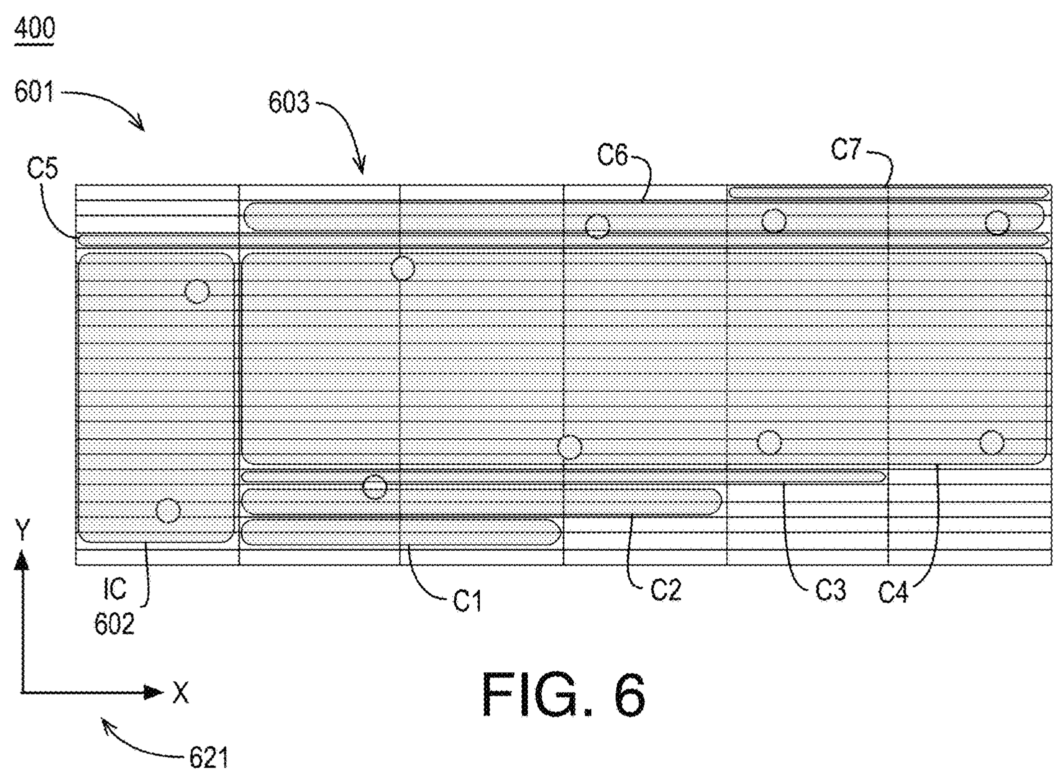
FIG. 6 illustrates example memory commands for attaining input image pixel values for de-warping an image modification region.

FIG. 6 illustrates example memory commands 601 for attaining input image pixel values for de-warping an image modification region, arranged in accordance with at least some implementations of the present disclosure. As shown in FIG. 6, memory commands 601 may include an internal memory command 602 and external memory commands 603, labeled C1-C7. Memory commands 601 may be generated to attain the necessary pixel values for de-warping image modification region 501 (the tetragon points of which are shown in FIG. 6 for the sake of clarity or presentation).

As shown in FIG. 6, memory commands 601 include internal memory command 602, which may also be characterized as a local memory command or the like. With reference to FIG. 5, internal memory command 602 corresponds to overlapping region 503. As discussed, the pixel data corresponding to overlapping region 503 was, in a previous iteration, retrieved from memory 400 to a local buffer or memory or the like, as is discussed further herein below. Therefore, in processing image modification region 501, memory 400 may not need to be accessed to attain the pixel data corresponding to overlapping region 503. That is, the pixel data corresponding to overlapping region 503 may be kept locally in the buffer or copied over from a local buffer to another local buffer in a dual buffer architecture. Therefore, internal memory command 602 is presented with respect to memory 400 for the purpose of illustrating that internal memory command 602 copies or retrieves pixel data corresponding to overlapping region 503 although memory 400 is not accessed for such pixel data.

The remaining memory commands 601 include external memory commands 603, which may be provided by a controller discussed below to access the pixel values in the memory regions overlapped by the illustrated external memory commands 603 (i.e., non-overlapping region 504). For example, external memory command C1 may be used to attain or retrieve the pixel values in the cache lines shown under or overlapped by external memory command C1. For example, external memory command C1 may be a 2-dimensional direct memory access command or the like that effectuates the retrieval of pixel values from the four cache lines shown overlapped by external memory command C1 and to a local buffer as discussed below. Similarly, external memory commands C2-C7 may retrieve corresponding pixel values in the cache lines corresponding thereto. Based on such internal memory command 602 and external memory commands 603, all of the pixel data necessary for processing image modification region 501 may be provided to a local buffer.

Furthermore, external memory commands 603 may be provided in an ordered manner (e.g., temporally) following the order C1, C2, C3, C4, C5, C6, C7 such that memory 400 is accessed in that order to reduce potential page misses. For example, such ordering of external memory commands 603 may be generated based on a spatial direction corresponding to image modification region 501 such that the commands are provided in a memory direction (in this case from a bottom left to a top right) with respect to memory coordinate system 621. For example, as discussed, input image data may be stored in memory 400 in a raster scan line by line order such that memory coordinate system 621 corresponds to image coordinate system 131 (please refer to FIG. 1).

To determine a memory command order for external memory commands 603, a controller or the like (as discussed further below) may determine a spatial direction corresponding to image modification region 501. The spatial direction of image modification region 501 may be generated using any suitable technique or techniques. For example, with reference to FIG. 3, for an image modification region having a single tetragon, top tetragon points P0' and P1' may be used to find a spatial direction in image coordinate system 131, bottom tetragon points P2' and P3' may be used to find a spatial direction in image coordinate system 131, an average of the directions determined using the top and bottom points may be used, or the like. In examples of image modification regions corresponding to multiple tetragons, the spatial directions determined using such techniques may be averaged, a single spatial direction from a representative tetragon may be used, tetragon points from first and last tetragons may be used, and so on.

In other examples, a vector field or the like may be provided such that regions of a sparse grid are provided spatial directions. With reference to FIG. 1, sparse grid 102 may be divided into regions such as regions 111, 112, 113, and so on such that sparse grid is fully divided into such regions and each region may be provided with a directional vector such as directional vector 121 corresponding to region 111, directional vector 122 corresponding to region 112, and so on. As shown, region 113 may not have a representative direction and such regions may not have directional vectors or may be provided with a default directional vector or the like. Furthermore, the granularity of the directional vectors may provide only an indication of whether the spatial direction is up or down (i.e., in a positive Y direction or negative Y direction) with respect to a left to right displacement (i.e., a positive X direction displacement).

With reference now to FIG. 6, such an up or down directional orientation may provide for the directionality of external memory commands 603. For example, as shown, the spatial direction of image modification region 501 may be determined to be up or positive Y or the like with respect to a left to right or positive X displacement or the like based on image modification region 501 being in region 111 or a region having a similar geometry. In such an example, with reference to FIG. 6, external memory commands 603 may be ordered as temporally ordered memory access commands, as shown, such that the commands access in the same directionality in the memory coordinate system 621. That is, external memory commands 603 are ordered in the positive Y direction or from a bottom to top or in an upward direction in memory 400. For example, if the spatial direction of image modification region 501 were reversed, the ordering of external memory commands 603 would also be reversed such that temporally, external memory commands 603 would be provided in the following order C7, C6, C5, C4, C3, C2, C1 such that the memory accesses are provided in a downward or negative Y direction or the like. For example, with reference again to FIG. 1, such external memory command ordering may be provided for region 112 or the like. Such ordering of memory commands may provide for fewer page misses and greater efficiency in data retrieval.

Figure 7:
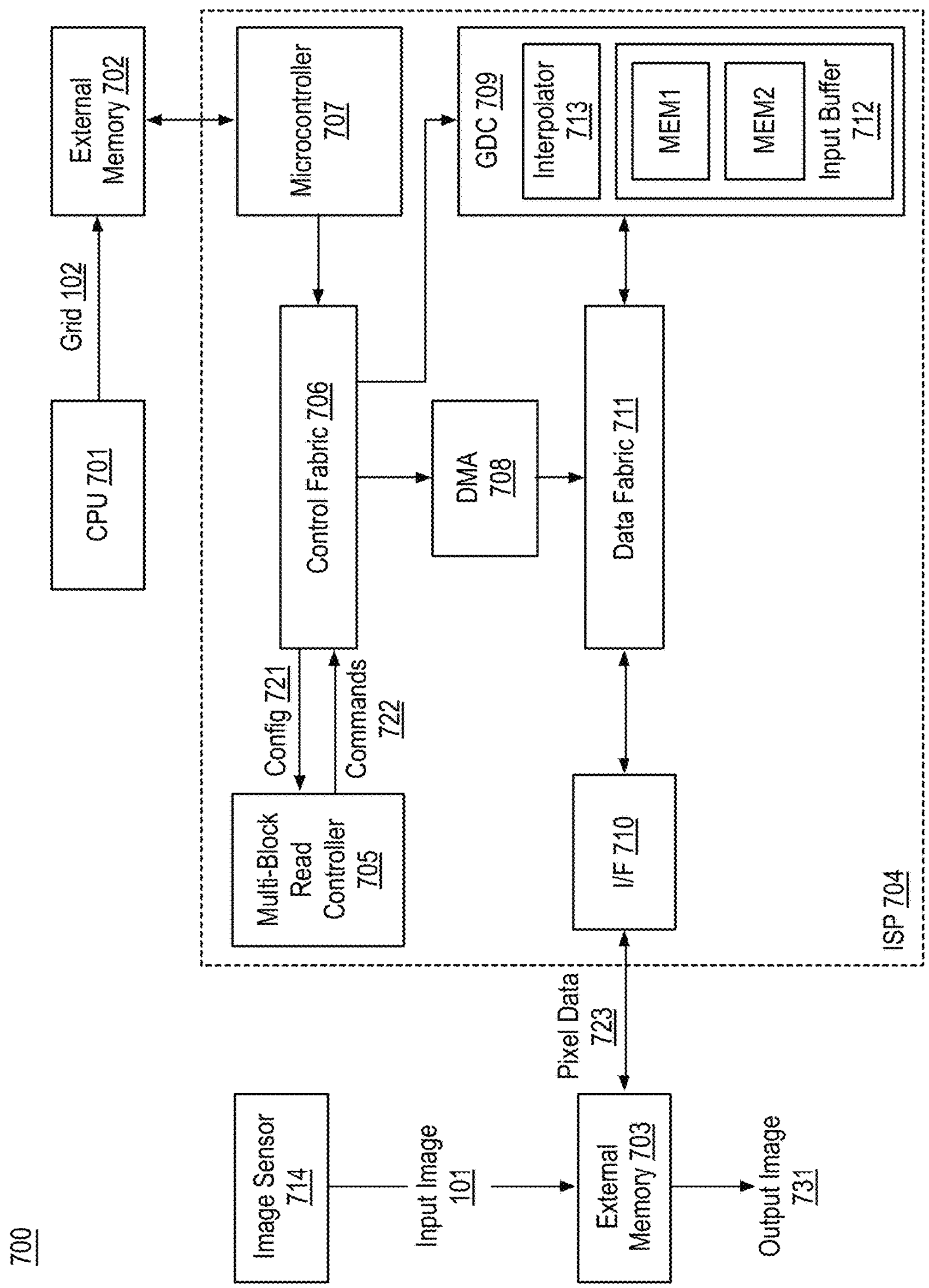
FIG. 7 is an example system for image de-warping.

FIG. 7 is an example system 700 for image de-warping, arranged in accordance with at least some implementations of the present disclosure. As shown in FIG. 7, system 700 may include a central processor (CPU) 701, an external memory 702, an external memory 703, an image signal processor 704, and an image sensor 714. Also as shown, image signal processor 704 may include a multi-block read controller 705, a control fabric 706, a microcontroller 707, a direct memory access (DMA) module 708, a geometric distortion correction module (GDC) 709 including an interpolator 713 and an input buffer 712 having first and second memory buffers (MEM1 and MEM2), an interface (I/F) 710, and a data fabric 711. System 700 may be implemented by any suitable form factor device such as a personal computer, laptop computer, ultra-laptop computer, tablet, touch pad, portable computer, handheld computer, palmtop computer, personal digital assistant, smartphone, camera, or the like. System 700 and/or image signal processor 704 may be characterized as an image processing system, imaging pipeline, a portion of an imaging pipeline, or the like. Furthermore, in some examples, image signal processor 704 or system 700 may be implemented as a system on a chip.

As shown, image sensor 714 may attain an input image 101. For example, image sensor 714 may be implemented via a camera or the like to attain input image 101 when exposed to a scene. In other examples, input image 101 may be received from another device, memory storage, or the like. Input image 101 may include any suitable image data including spatial pixel data or the like. As shown, input image 101 may be stored to external memory 703, which may correspond to memory 400 as discussed herein. Furthermore, CPU 701 may generate or provide a sparse grid 102 to external memory 702. In some examples, sparse grid 102 may be based on a lens or other features of a camera implemented by system 700. As shown, external memory 702 and external memory 703 may be implemented separately. In other examples, external memory 702 and external memory 703 may be implemented together in the same physical memory and/or in the same virtual memory space. In an embodiment, prior to input image or frame processing, image signal processor 704 may be initialized including providing configuration settings (config) 721 such that the following may be established: number of pixels per cache line, filter size, distortion correction type, pixel ordering (e.g., raster, tile, compressed), direct memory access and memory characteristics, acknowledgment protocols, and the like.

In operation, for a current region of interest (e.g., tetragon plus filter padding), multi-block read controller 705 or microcontroller 707 may determine whether or not multiple regions of interest are to be grouped. If so, the number of regions of interest may be grouped by multi-block read controller 705 or microcontroller 707 into an image modification region or group of blocks or the like. If not, the current region of interest may be characterized as an image modification region. Based on the current image modification region, multi-block read controller 705 may determine the regions of external memory 703 having pixel data that is needed for de-warping the current image modification region as discussed herein. For example, multi-block read controller 705 may determine the minimum required cache lines needed to be accessed to retrieve the needed pixel data. For example, multi-block read controller 705 may determine region of memory 502 or the like.

Assuming pixel data have been previously retrieved for a previous image modification region, multi-block read controller 705 may also determine whether any pixel data overlaps between the previous image modification region and the current image modification region. If so, multi-block read controller 705 may generate an internal memory command of commands 722 to copy the overlapping pixel data from one portion of input buffer 712 (e.g., MEM1) to another portion of input buffer 712 (e.g., MEM2). For example, input buffer 712 may provide a double buffer such that a previous image modification region may be processed out of MEM1, a current image modification region may be processed out of MEM2, a next image modification region may be processed out of MEM1, and so on such that successive image modification regions are processed by alternative buffers or buffer regions of input buffer 712. As discussed, internally copying of such overlapping pixel data may prevent external memory 703 from being accessed for such pixel data saving bandwidth and power. In other examples, multi-block read controller 705 may generate an internal memory command of commands 722 to retain the overlapping pixel data within input buffer 712. For example, the overlap pixel data may correspond to the pixel data in overlapping region 503 or the like.

For non-overlapping pixel data for the current image modification region (or for all of the pixel data if no overlap was detected), multi-block read controller 705 may generate external direct memory access commands of commands 722, which may be communicated through control fabric 706 to DMA module 708. DMA module 708 may receive the commands, format them as needed, and provide them through data fabric 711 and interface 710 such that the DMA commands provide for the pixel data to be retrieved from external memory 703 as a part of pixel data 723 to input buffer 712. For example, control fabric 706 and data fabric 711 may provide instruction and control protocols and data protocols, respectively for transferring instructions and data within image signal processor 704. Such instructions and data may be advantageously separated for efficient communication within image signal processor 704. For example, the non-overlapping pixel data may correspond to the pixel data in non-overlapping region 504 or the like.

The external direct memory access commands generated by multi-block read controller 705 may minimize a number of commands needed to access the pixel data in the non-overlapping region. For example, with reference to FIG. 6, the commands may be structured that a first command (e.g., C1) begins at a single cache line at a left side of the memory, extends from the starting cache line as far as needed to capture cache lines in the same row (e.g., in the positive X direction) as the single cache line (e.g., including two cache lines in the example of C1), and then extends upward (e.g., in a positive Y direction) with such a width equal to the number of captured cache lines as long as the width matches the required width for the row of cache lines (e.g., including two rows in the example of C1). For the first row that does not match the command may not apply. Thus, for the example of C1, the corresponding memory access command may retrieve pixel data in a 2 cache line by 2 cache line region. Such processing may continue in an upward (e.g., in a positive Y direction) until the entirety of non-overlapping region 504 is captured. Although discussed moving from a bottom to a top and from left to right of the memory, any suitable directionality may be applied to capture the pixel data of non-overlapping region 504 with the external direct memory access commands.

Furthermore, the external direct memory access commands generated by multi-block read controller 705 may be provided in a temporal order as discussed herein such that the temporal order provides commands that access memory in a direction corresponding to a spatial direction of the current image modification region. As discussed, in the example of FIG. 6, such ordered external direct memory access commands may be provided in an order of C1 through C7. Such ordering of direct memory access commands may avoid unwanted page misses and the like.

Returning to FIG. 7, as discussed, such internal memory commands and external memory commands may provide both the overlapping pixel data and the non-overlapping pixel data necessary for processing the current image modification region to one of MEM1 or MEM2 of input buffer 712. Interpolator 713 of geometric distortion correction module 709 may access the pixel data for the current image modification region and perform interpolation, translation, and the like as discussed herein to provide output distortion corrected pixel data for an output image. The output distortion corrected pixel data may be transferred to external memory 703 (or another external memory) and such processing may continue at a next region of interest and/or image modification region. For example, for the subsequent image modification region, a determination may be made as to whether and how many regions of interest (e.g., tetragon pixels plus filter support) are to be grouped, the regions of interest may be grouped to provide the image modification region, an overlap of pixel data with respect to the previous image modification region may be determined and locally transferred within input buffer 712, non-overlapping pixel data may be retrieved from external memory 703, and the interpolation may be performed based on the sparse grid, selected filter size and coefficients, and so on. When each region of interest has been processed, distortion corrected output image 731 may be output for further processing within an image processing pipeline, stored to additional memory, transmitted to other components, or the like.

Figure 8:
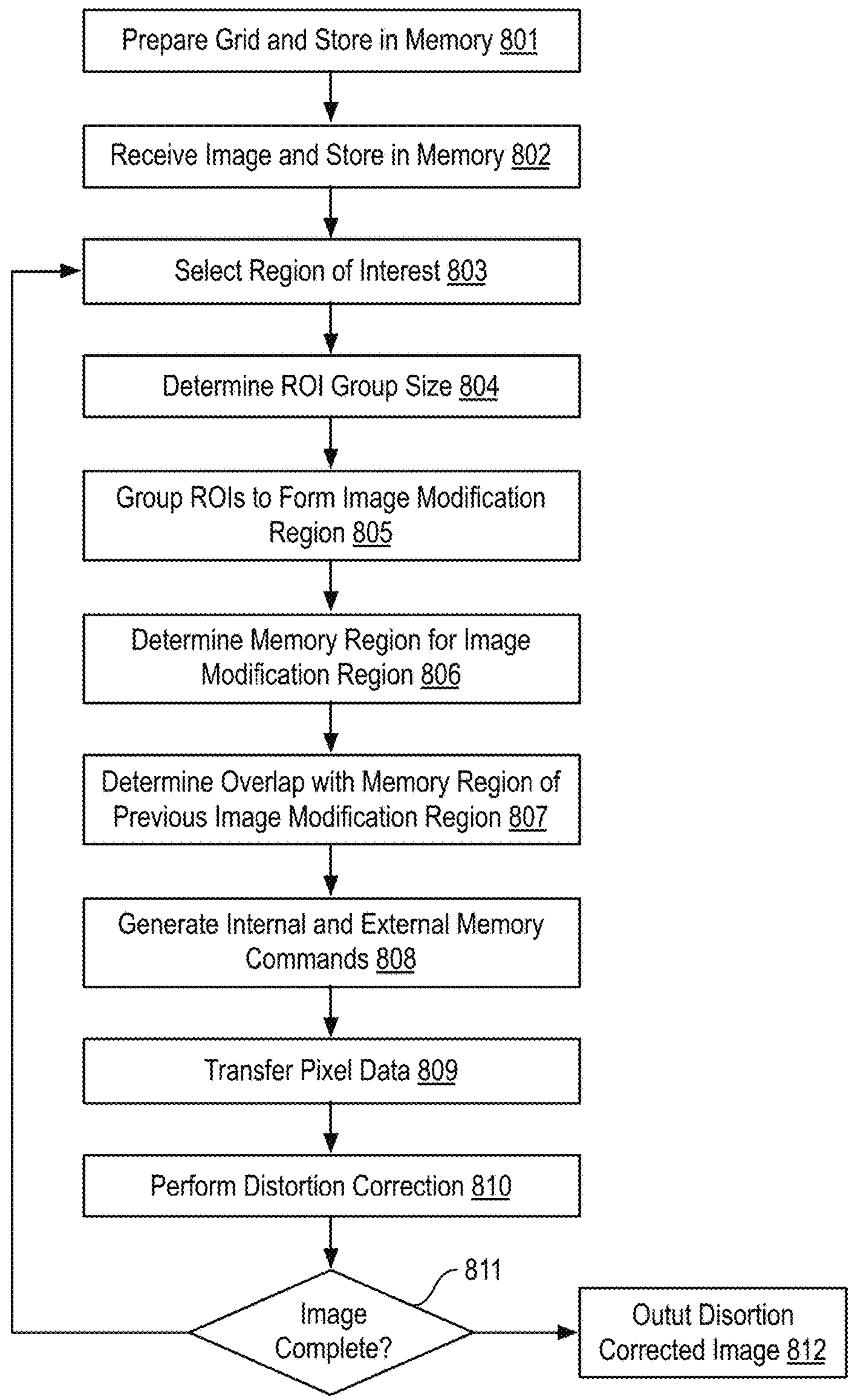
FIG. 8 is a flow diagram illustrating an example process for image de-warping.

FIG. 8 is a flow diagram illustrating an example process 800 for image de-warping, arranged in accordance with at least some implementations of the present disclosure. Process 800 may include one or more operations 801-812 as illustrated in FIG. 8. As shown, process 800 may begin at operation 801 where a sparse grid for image de-warping may be prepared and stored. The sparse grid for image de-warping may include any suitable data representative of a sparse grid of neighboring shapes for image de-warping. For example, the sparse grid may include X,Y-coordinates for corner points of tetragons or other shapes for image de-warping. In an embodiment, operation 801 may be performed by a central processing unit or core. Process 800 may also include initialization operations prior to processing an input image or frame. For example, the initialization may include establishing number of pixels per cache line, filter size, distortion correction type, pixel ordering (e.g., raster, tile, compressed), direct memory access and memory characteristics, acknowledgment protocols, and the like.

Processing may continue at operation 802, where an input image or frame may be received and stored in memory. The input image may include any suitable image data as discussed herein and the input image may be stored in any suitable memory such as an external DRAM or the like. Processing may continue at operation 803 where a region of interest of the grid and/or input image may be selected. For example, the region of interest may include a tetragon or other shape defined by the sparse grid for processing. As used herein the region of interest may include a tetragon or other shape of the sparse grid or the tetragon or other shape of the sparse grid plus filter support for the tetragon or other shape. In an embodiment, such regions of interest may be processed in a raster order with respect to the sparse grid and the input image.

Processing may continue at operation 804, where a region of interest group size may be determined. For example, the region of interest group size may determine the number of regions of interest that are going to be grouped to generate an image modification region for pixel data retrieval. The region of interest group size may be determined using any suitable technique or techniques. In an embodiment, the region of interest group size may be a predefined number such as one (e.g., no grouping is to be performed), two to eight, or more. In an embodiment, the region of interest group size may be determined dynamically based on a distortion of the region of interest or a portion of the sparse grid including the region of interest.

Figure 9:
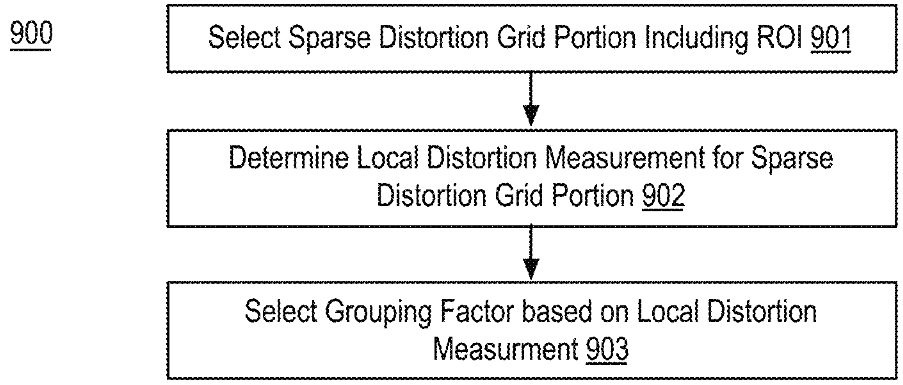
FIG. 9 illustrates an example process for determining a grouping factor or region of interest group size.

FIG. 9 illustrates an example process 900 for determining a grouping factor or region of interest group size, arranged in accordance with at least some implementations of the present disclosure. As shown, process 900 may begin at operation 901, where a sparse distortion grid portion including the current region of interest may be selected. The sparse distortion grid portion may be selected using any suitable technique or techniques. In an embodiment, the sparse distortion grid portion is the region of interest itself. In an embodiment, the sparse distortion grid portion includes the region of interest and one or more adjacent regions of interest (e.g., one or more on either side of the region of interest or one or more on the leading side of the region of interest). In an embodiment, the sparse distortion grid portion is a region of any size including and surrounding the region of interest. With reference to FIG. 1, regions 111, 112, 113, or the like may be defined around center tetragons for each region.

Processing may continue at operation 902, where a local distortion measurement may be determined for the sparse distortion grid portion selected at operation 901. The local distortion measurement may include any suitable measurement of distortion such as the deviation between a tetragon (of the region of interest) and a rectangle as determined based on positional differences between the corner points or a deviation of an expected area or the like, a sum of such deviations for grid portions having multiple tetragons, or the like.

Processing may continue at operation 903, where a grouping factor may be determined based on the local distortion measurement. The grouping factor (i.e., the number of regions of interest to be grouped) may be determined using any suitable technique or techniques. In an embodiment, the local distortion measurement is compared to one or more thresholds such that if the local distortion measurement is less than a first, lowest threshold, a maximum grouping factor (e.g., a grouping factor of 8) is provided, if the local distortion measurement is between the first threshold and a second, higher threshold, a next largest grouping factor is provided (e.g., 7), and so on. For example, a grouping factor of 1 (i.e., no grouping) may be provided if the local distortion measurement is greater than a final threshold. Similarly, the local distortion measurement may be mapped to a grouping factor such that the greater the local distortion the fewer regions of interest are grouped together.

As discussed, process 900 may provide for grouping factors for regions of interest of a sparse grid. In some examples, process 900 may be performed in real time during processing an input image. In other examples, process 900 may be performed prior to such processing and process 900 may provide region of interest grouping factor data or the like defining groupings of regions of interest to generate image modification regions as discussed herein. For example, such grouping data may be stored and accessed during processing.

Returning to FIG. 8, process 800 may continue at operation 805, where the region of interest selected at operation 803 may be grouped with one or more additional regions of interest to form an image modification region. If no grouping is provided, the selected region of interest may be characterized as an image modification region. Furthermore, operation 805 may include generating the image modification region by providing the required filter support pixel positions (e.g., filter padding) as discussed herein.

Processing may continue at operation 806, where the memory region corresponding to the image modification region generated at operation 805 may be determined. For example, the region of memory for the entirety of the image modification region may include the grouped tetragons plus filter padding in the image space, which may be translated to the memory space and may further include the entirety of each cache line that the tetragons plus filter padding in the image space aligns to in the memory space.

Processing may continue at operation 807, where an overlap with a memory region of a previous image modification region may be determined. As will be appreciated, for a first image modification region, operation 807 may be skipped. For subsequent image modification regions, operation 807 may be performed to identify pixel data required by the current image modification region that was also used by a previous image modification region. Such overlap may be determined in the external memory space as discussed herein although the resultant overlap pixel data will not actually be accessed through the external memory space in the current iteration. The overlap may be determined using any suitable technique or techniques. In an embodiment, the memory region of the current image modification region may be compared to the memory region of the previous image modification region and any matching sub-regions may be identified as an overlapping memory region. In an embodiment, determining the overlap may include determining a vertical (e.g., Y direction) overlap with respect to the previous image modification region. Operation 807 may also identify non-overlapping memory regions of the memory region of the current image modification region.

Processing may continue at operation 808, where internal and external memory commands may be generated. For the overlapping pixel data as determined at operation 807, internal memory commands may be generated to either re-use the pixel data or to transfer the pixel data from one internal buffer to another internal buffer. For example, in a double buffer implementation, the pixel data corresponding to the overlap memory regions determined at operation 807 may be copied from a first buffer (accessed to process a previous image modification region) to a second buffer (accessed to process the current image modification region). For non-overlapping pixel data the external memory is accessed to retrieve the pixel data. To retrieve such pixel data, direct memory access commands are generated. For example, the direct memory access commands may include multiple 2-dimensional memory access commands (e.g., each providing a start an end cache line) that provide a minimum number of direct memory access commands to access the non-overlapping pixel data. In some embodiments, the external direct memory access commands may be ordered (e.g., temporally ordered).

Figure 10:
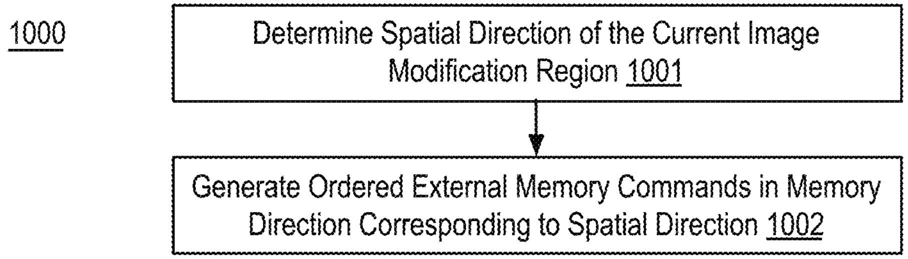
FIG. 10 illustrates an example process for determining an order for external direct memory access commands.

FIG. 10 illustrates an example process 1000 for determining an order for external direct memory access commands, arranged in accordance with at least some implementations of the present disclosure. As shown, process 1000 may begin at operation 1001, where a spatial direction of the current image modification region may be determined. The spatial direction of the current image modification region may be determined using any suitable technique or techniques such as those discussed herein. For example, the image modification region and/or the sparse grid representing the image modification region may be analyzed to determine the spatial direction. As discussed herein, the spatial direction may be determined with respect to an image coordinate system and the spatial direction may provide whether the shape of the image modification region is oriented in an upward or downward direction with respect to horizontal displacement from left to right in the sparse grid space. With reference to FIG. 1, image modification regions corresponding to region 111 have a spatial direction of upward with respect to a horizontal displacement from left to right as shown by directional vector 121 and image modification regions corresponding to region 112 have a spatial direction of downward with respect to a horizontal displacement from left to right as shown by directional vector 122.

Processing may continue at operation 1002, where ordered external memory commands having an order in a memory direction corresponding to the spatial direction determined at operation 1001 may be generated. The ordered external memory commands may be generated using any suitable technique or techniques. For example, when the spatial direction of the image modification region is determined to be up or upward or in the positive Y direction at operation 1001, the external memory commands may be ordered in a corresponding up or upward or positive Y direction with respect to a memory coordinate system. With reference to FIG. 6, since pixel data is stored in memory 400 in a raster order line by line, external memory commands may be provided in an upward or positive Y direction in memory 400. Such ordering of external memory commands may provide for fewer page misses and the like.

As discussed, process 1000 may provide for ordered external memory commands accessing external memory to retrieve non-overlap pixel data in non-overlap memory regions between a current image modification region and a previous image modification region. In some examples, operation 1001 of process 1000 may be performed in real time during processing an input image. In other examples, operation 1001 may be performed prior to such processing to generate spatial direction data or the like defining spatial directions of image modification regions as discussed herein. For example, such spatial direction data may be stored and accessed during processing of an input image.

Returning to FIG. 8, process 800 may continue at operation 809, where pixel data may be transferred based on the internal and external memory commands generated at operation 808. For example, the internal memory commands may initiate the copy of overlap pixel data between internal buffers as discussed. Furthermore, external memory commands may initiate the retrieval of pixel data for non-overlap regions from external memory to the internal buffers.

Processing may continue at operation 810, where distortion correction may be performed for the current image modification region based on the attained pixel data. Such distortion correction may be performed using any suitable technique or techniques such as pixel interpolation, translation, and the like. As discussed, the distortion correction for the current image modification region may generate a portion of a distortion corrected output image.

Processing may continue at decision operation 811, where a determination may be made as to whether the input image has completed processing. If so, processing may continue at operation 812, where the distortion corrected output image may be output for further processing, display, or the like. If the input image has not completed processing, processing may continue at operation 803, where a next region of interest may be selected and processing may continue as discussed herein. As will be appreciated, if regions of interest were grouped at operation 805, the next region of interest selected at operation 803 may be the first ungrouped region of interest in raster order.

As discussed, process 800 may provide for image distortion correction for an input image or video frame. In addition or in the alternative, image distortion correction may include a first stage of preparing a sparse grid including generating grid coordinates by a CPU and storing the coordinates in memory. A second stage may include a second stage prior to image or frame processing including enabling the image or frame processing by establishing, for each grid channel, a number of pixels per cache line (e.g., 64, 51, 42, 36, 32), a bits per pixel (e.g., 8, 10, 12, 14, 16), a filter pad or size (e.g., 2×2 filter or the like), a distortion algorithm optimization type, and a pixel ordering in the memory (e.g., raster, tile, compressed, etc.). A third stage may then provide a processing loop for regions of interest or blocks including writing a regions of interest group size or group of block (GOB) size (e.g., N: 1-8 blocks), writing the N block grid points (e.g., 2*N+2 points for a 2×2 filter), writing the active grid channel, generating external DMA commands for grouped regions of interest, generating internal DMA command(s), getting acknowledgment from the multi-bock read controller on the current GOB, writing the new GOB (to same or different channel), getting acknowledgment from the multi-bock read controller that channel x is ready, and sending blocks for GDC processing. For example, generating the external DMA commands for grouped regions of interest may include getting a command to read the next N blocks, for each GDC block (e.g., tetragon+filter+cache line align) of the N×1 preparing the ROI from the grid by preparing the aligned X range and Y range of pixel indexes for tetragon+filter for each 4 grid points and preparing the cache lines needed for this block (e.g., ROI), ROI packing optimization of several blocks, sending commands to DMA, saving parameters for the next GOB according to grid channel ID to utilize the internal copy of the overlap, sending acknowledgment that all commands are in the DMA and the multi-block read controller is ready for next GOB (and with acknowledgment, sending the upper left GOB coordinates to provide the GDC the 0,0 relative coordinates of the GOB), and waiting for acknowledgment from the DMA that all data is in internal memory and sending acknowledgement. Furthermore, generating the internal DMA command may include checking the vertical overlap from previous GOB, waiting for acknowledgment that previous GOB is in internal memory, and giving internal DMA command to transfer from one buffer (previous) to second buffer (current GOB).

Figure 11:
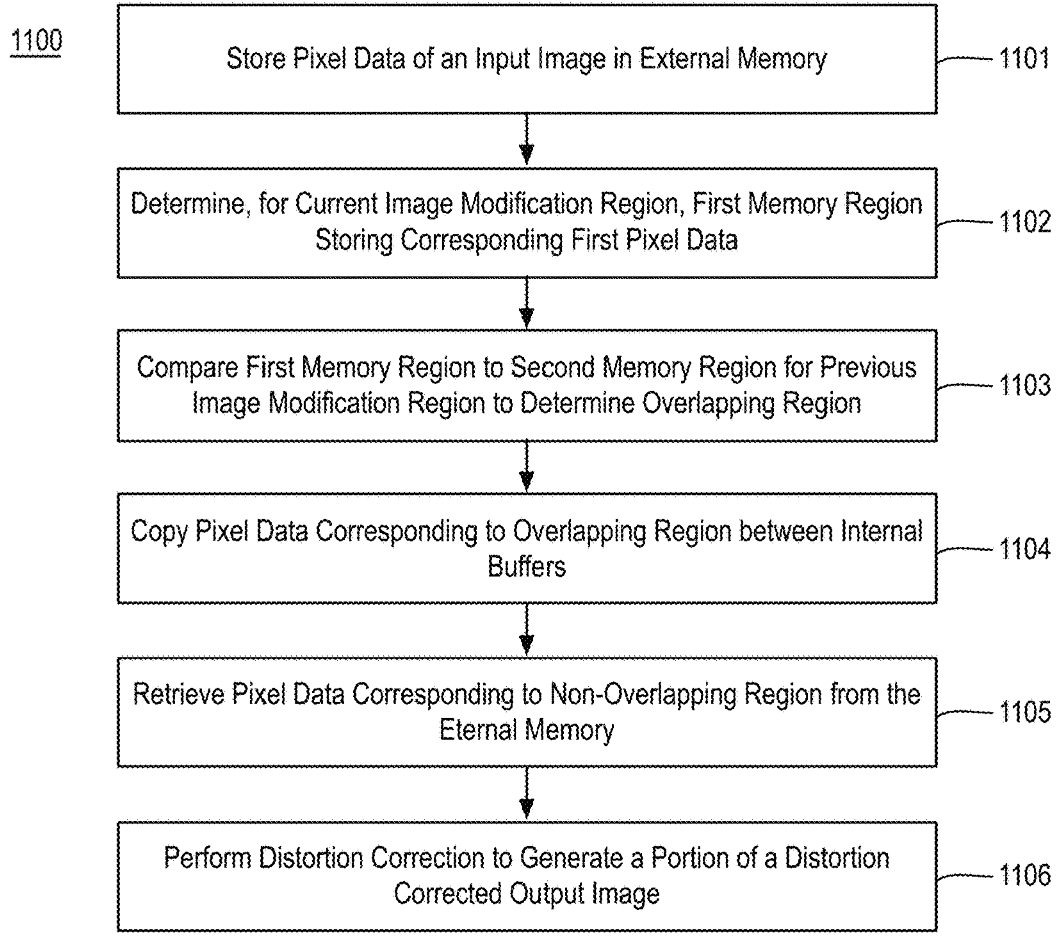
FIG. 11 is a flow diagram illustrating an example process for attaining pixel data for image de-warping.

FIG. 11 is a flow diagram illustrating an example process 1100 for attaining pixel data for image de-warping, arranged in accordance with at least some implementations of the present disclosure. Process 1100 may include one or more operations 1101-1106 as illustrated in FIG. 11. Process 1100 may form at least part of an image or frame de-warping process. By way of non-limiting example, process 1100 may form at least part of an image or frame de-warping process as performed by any device or system as discussed herein such as system 700. Furthermore, process 1100 will be described herein with reference to system 1200 of FIG. 12.

Figure 12:
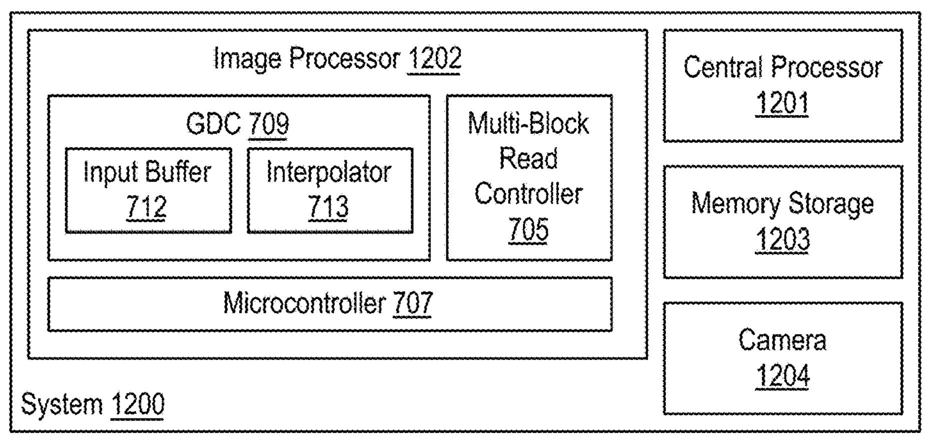
FIG. 12 is an illustrative diagram of an example system for attaining pixel data for image de-warping.

FIG. 12 is an illustrative diagram of an example system 1200 for attaining pixel data for image de-warping, arranged in accordance with at least some implementations of the present disclosure. As shown in FIG. 12, system 1200 may include central processor 1201, an image processor 1202, a memory storage 1203 (e.g., electronic storage, computer storage, computer memory, or the like), and a camera 1204. Also as shown, image processor 1202 may include geometric distortion correction module 709 including interpolator 713 and input buffer 712, multi-block read controller 705, and microcontroller 707. In the example of system 1200, memory storage 1203 may store image or video data such as frame data or related content such as sparse grids, sparse grid data, image data, input images, input frames, region data, region of interest data, pixel data, image modification region data, spatial direction data, memory region data, memory commands, region of interest grouping factors, or the like.

As shown, in some examples, geometric distortion correction module 709, multi-block read controller 705, and microcontroller 707 may be implemented via image processor 1202. In other examples, one or more or portions of geometric distortion correction module 709, multi-block read controller 705, and microcontroller 707 may be implemented via central processor 1201 or another processing unit such as a graphics processor or the like.

Image processor 1202 may include any number and type of image or graphics processing units that may provide the operations as discussed herein. Such operations may be implemented via software or hardware or a combination thereof. For example, image processor 1202 may include circuitry dedicated to manipulate video, pictures, picture data, or the like obtained from memory storage 1203. Central processor 1201 may include any number and type of processing units or modules that may provide control and other high level functions for system 1200 and/or provide any operations as discussed herein. Memory storage 1203 may be any type of memory such as volatile memory (e.g., Static Random Access Memory (SRAM), Dynamic Random Access Memory (DRAM), etc.) or non-volatile memory (e.g., flash memory, etc.), and so forth. Camera 1204 may include any suitable image capture components such as a lens, an aperture, and an image sensor.

In an embodiment, one or more or portions of geometric distortion correction module 709, multi-block read controller 705, and microcontroller 707 may be implemented via an execution unit (EU). The EU may include, for example, programmable logic or circuitry such as a logic core or cores that may provide a wide array of programmable logic functions. In an embodiment, one or more or portions of geometric distortion correction module 709, multi-block read controller 705, and microcontroller 707 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 may begin at operation 1101, where pixel data of an input image may be stored in external memory. For example, an input image (or a portion thereof) may stored in memory storage 1203. In an embodiment, memory storage 1203 or a portion thereof may be dynamic random access memory such as double data rate synchronous dynamic random access memory or the like. In an embodiment, memory storage 1203 provides pixel data storage by cache line in a raster order. For example, may include an organized grid of cache lines that store pixel data in a raster order matching the geometry of the input image.

Processing may continue at operation 1102, where, for a current image modification region of the input image, a corresponding region of the memory storing first pixel data corresponding to the current image modification region may be determined. For example, multi-block read controller 705 or microcontroller 707 as implemented by image processor 1202 may determine, for the current image modification region, a region of memory storage 1203 that is storing pixel data corresponding to the current image modification region. The current image modification region may include any suitable image portion or region as discussed herein. In an embodiment, the current image modification region corresponds to a plurality of points of a sparse distortion correction grid and a filter support region at least partially surrounding the plurality of points. For example, the plurality of points may define a tetragon having four corner grid points and the filter support region may include a region around the tetragon to support a 2-dimensional pixel filter. In an embodiment, the current image modification region includes pixel locations for one or more tetragons of a sparse grid and pixel locations for filter support needed to interpolate output pixel values corresponding to the one or more tetragons.

In an embodiment, process 1100 further includes determining at least a first and a second region of interest of the input image such that each of the first and second regions of interest comprises an image region and a filter support region at least partially surrounding the image region and grouping at least the first and second of regions of interest to generate the current image modification region. In an embodiment, process 1100 further includes determining, for a portion of a sparse distortion grid corresponding to at least the current image modification region, a local distortion measurement, determining a region grouping factor for the portion of the sparse distortion grid based on the local distortion measurement, and grouping a number of regions of interest equal to the region grouping factor to generate the current image modification region. For example, determining the region grouping factor may include comparing the local distortion measurement to at least one threshold and providing a first region grouping factor when the local distortion measurement is greater than the threshold and a second region grouping factor greater than the first region grouping factor when the local distortion measurement is less than the threshold.

Processing may continue at operation 1103, where the region of the memory determined at operation 1102 may be compared to a second region of the memory corresponding to second pixel data of a previous image modification region of the input image to generate an overlapping region of the memory that is in both the region and the second region. For example, operation 1103 may also generate a non-overlapping region of the memory that is in the region and not in the second region. For example, multi-block read controller 705 or microcontroller 707 as implemented by image processor 1202 may compare the regions of memory for the current and previous image modification region to generate the overlapping and non-overlapping regions of memory.

Processing may continue at operation 1104, where pixel data corresponding to the overlapping region of the memory may be copied from a first internal buffer to a second internal buffer such that the first and second internal buffers are separate from the memory. For example, under command of multi-block read controller 705 or microcontroller 707 as implemented by image processor 1202, the pixel data corresponding to the overlapping region may be copied between buffers of input buffer 712. Such pixel data copying may be performed in double buffer implementations for example. In other embodiments, the pixel data corresponding to the overlapping region may be retained by input buffer 712 or the like. For example the pixel data corresponding to the overlapping region may be previously fetched from memory storage 1203 with respect to memory access commands corresponding to retrieving pixel data corresponding to the non-overlapping region as discussed with respect to operation 1105.

Processing may continue at operation 1105, where pixel data corresponding to the non-overlapping region of the memory may be retrieved from the memory and stored to the second internal buffer. For example, under command of multi-block read controller 705 or microcontroller 707 as implemented by image processor 1202, the pixel data corresponding to the non-overlapping region may be retrieved from memory storage 1203 and stored to image buffer 712. In double buffer implementations, the pixel data corresponding to the non-overlapping region may be stored in the same buffer that the pixel data corresponding to the overlapping region was copied to. Thereby, both the overlapping and non-overlapping region pixel data is ready for processing. In an embodiment, retrieving the pixel data corresponding to the non-overlapping region includes retrieving the fourth pixel data based on multiple ordered memory access commands and process 1100 further includes determining a spatial direction corresponding to the current image modification region with respect to a coordinate system of the input image and ordering the multiple ordered memory access commands in a memory direction corresponding to the spatial direction such the memory direction is with respect to a coordinate system of the memory. For example, the coordinate system of the input image may be aligned with a capture or presentation orientation of the input image and the coordinate system of the memory may provide for storing pixel data of the input image in a layout matching the coordinate system of the input image.

Processing may continue at operation 1106, where distortion correction may be performed based on accessing at least on the pixel data corresponding to the overlapping and non-overlapping regions in the second internal buffer to generate a portion of a distortion corrected output image. For example, interpolator 713 of multi-block read controller 705 as implemented by image processor 1202 may access the pixel data in input buffer 712 and perform distortion correction to generate a portion of a distortion corrected output image. The distortion correction may be performed using any suitable technique or techniques. Operations 1102-1106 may be repeated any number of times to generate a complete distortion corrected output image. The distortion corrected output image may be stored to memory storage 1203, other memory or storage, transmitted to another device, presented to a user via a display, or the like.

Process 1100 may be repeated any number of times either in series or in parallel for any number image modification regions, input images, frames, or the like. As discussed, process 1100 may provide for image de-warping or warping for lens distortion correction (LDC), digital video stabilization (DVS), or other image warping or de-warping applications. For example, the discussed techniques for reading pixel data from memory for image warping or de-warping may provide for efficient memory access in terms of bandwidth, power, and the like.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
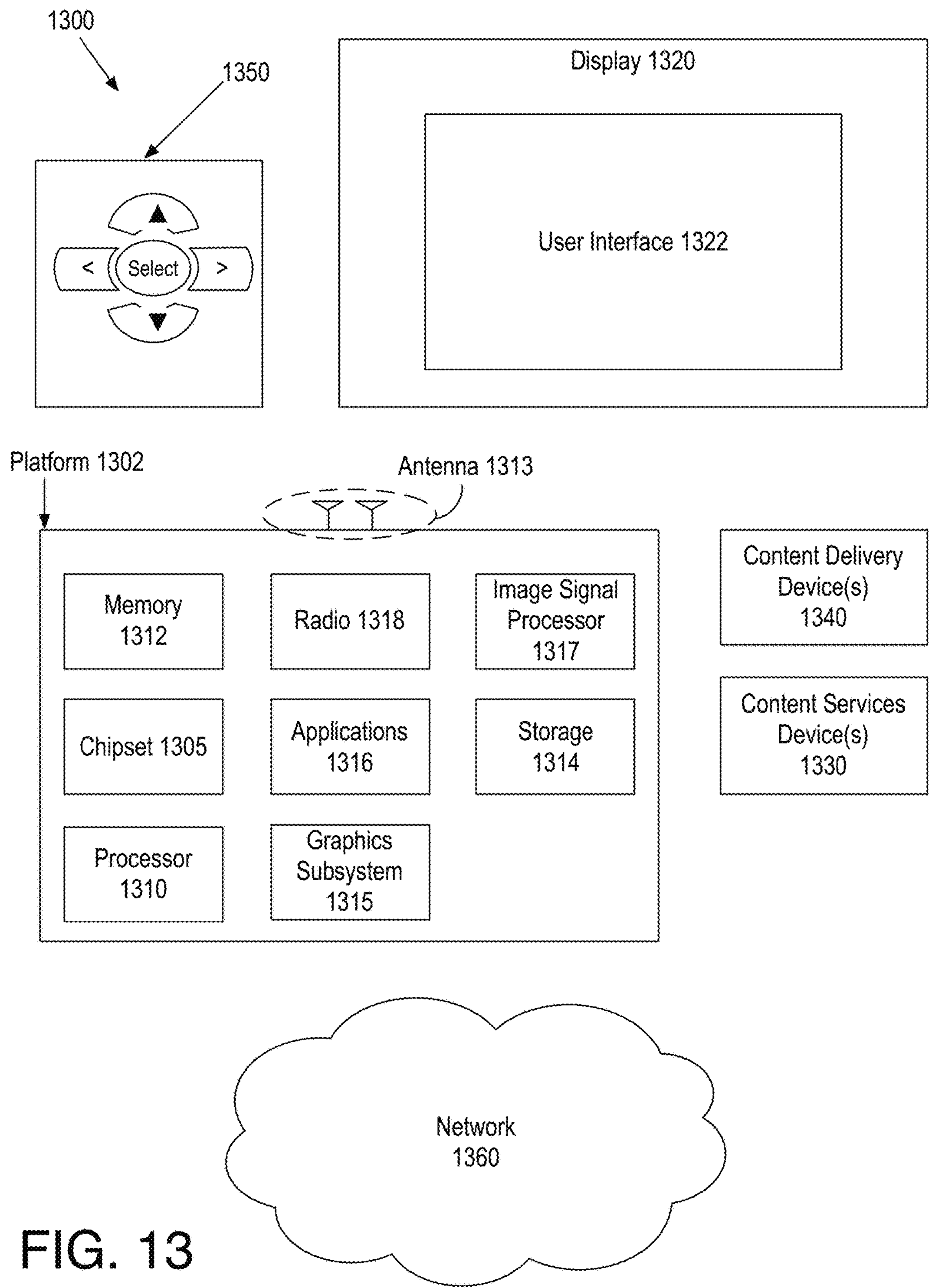
FIG. 13 is an illustrative diagram of an example system.

FIG. 13 is an illustrative diagram of an example system 1300, arranged in accordance with at least some implementations of the present disclosure. In various implementations, system 1300 may be a mobile system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, image signal processor 1317, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 and/or image signal processor 1317 may perform processing of images such as still or video for display. Graphics subsystem 1315 may be a graphics processing unit (GPU) or a visual processing unit (VPU), for example. Image signal processor 1317 may be an image processing unit, for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of may be used to interact with user interface 1322, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1320) by movements of a pointer, cursor, focus ring, or other visual indicators displayed on the display. For example, under the control of software applications 1316, the navigation features located on navigation may be mapped to virtual navigation features displayed on user interface 1322, for example. In various embodiments, may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
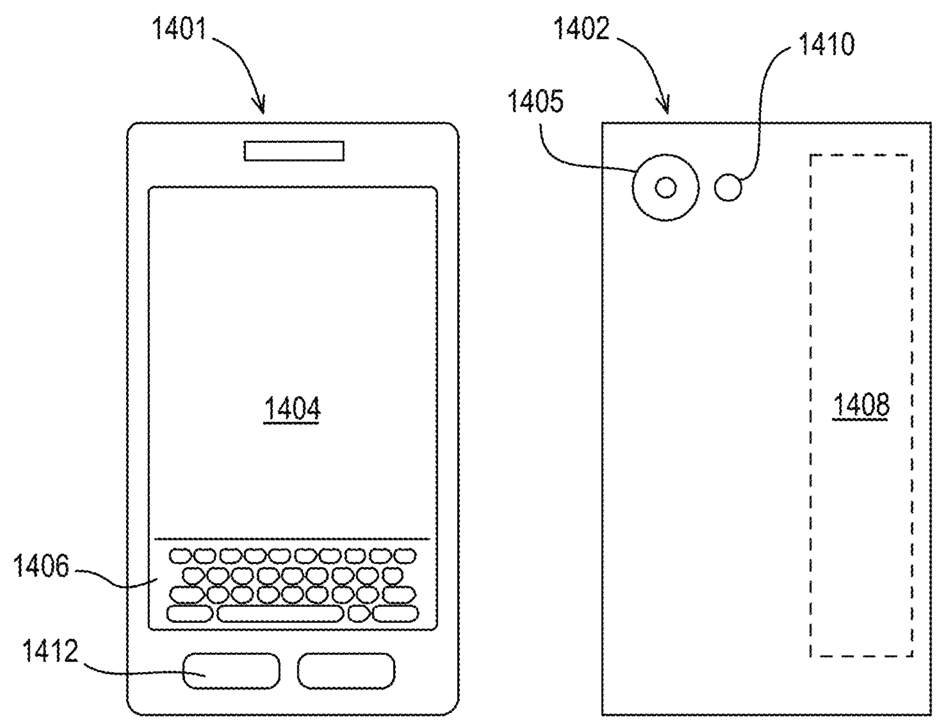
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, system 100 or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a machine based method for attaining pixel data for image de-warping comprises storing pixel data corresponding to at least a portion of an input image in a memory, determining, for a current image modification region of the input image, a corresponding first region of the memory storing first pixel data corresponding to the current image modification region, comparing the first region of the memory to a second region of the memory corresponding to second pixel data of a previous image modification region of the input image to generate an overlapping region of the memory that is in both the first region and the second region, retrieving fourth pixel data corresponding to a non-overlapping region of the first region of the memory from the memory and storing the fourth pixel data to the second internal buffer, and performing distortion correction based on accessing at least on the third and fourth pixel data in the second internal buffer to generate a portion of a distortion corrected output image.

Further to the first embodiments, retrieving the fourth pixel data comprises retrieving the fourth pixel data based on a plurality of ordered memory access commands and the method further comprises determining a spatial direction corresponding to the current image modification region with respect to a coordinate system of the input image and ordering the plurality of ordered memory access commands in a memory direction corresponding to the spatial direction such that the memory direction is with respect to a coordinate system of the memory.

Further to the first embodiments, retrieving the fourth pixel data comprises retrieving the fourth pixel data based on a plurality of ordered memory access commands and the method further comprises determining a spatial direction corresponding to the current image modification region with respect to a coordinate system of the input image and ordering the plurality of ordered memory access commands in a memory direction corresponding to the spatial direction such that the memory direction is with respect to a coordinate system of the memory such that the coordinate system of the input image is aligned with a capture or presentation orientation of the input image and the coordinate system of the memory provides for storing pixel data of the input image in a layout matching the coordinate system of the input image.

Further to the first embodiments, the current image modification region corresponds to a plurality of points of a sparse distortion correction grid and a filter support region at least partially surrounding the plurality of points.

Further to the first embodiments, the current image modification region corresponds to a plurality of points of a sparse distortion correction grid and a filter support region at least partially surrounding the plurality of points and the plurality of points define a tetragon having four corner grid points and the filter support region comprises a region around the tetragon to support a 2-dimensional pixel filter.

Further to the first embodiments, the method further comprises determining at least a first and a second region of interest of the input image such that each of the first and second regions of interest comprises an image region and a filter support region at least partially surrounding the image region and grouping at least the first and second of regions of interest to generate the current image modification region.

Further to the first embodiments, the method further comprises determining, for a portion of a sparse distortion grid corresponding to at least the current image modification region, a local distortion measurement, determining a region grouping factor for the portion of the sparse distortion grid based on the local distortion measurement, and grouping a number of regions of interest equal to the region grouping factor to generate the current image modification region.

Further to the first embodiments, the method further comprises determining, for a portion of a sparse distortion grid corresponding to at least the current image modification region, a local distortion measurement, determining a region grouping factor for the portion of the sparse distortion grid based on the local distortion measurement, and grouping a number of regions of interest equal to the region grouping factor to generate the current image modification region such that determining the region grouping factor comprises comparing the local distortion measurement to at least one threshold and providing a first region grouping factor when the local distortion measurement is greater than the threshold and a second region grouping factor greater than the first region grouping factor when the local distortion measurement is less than the threshold.

Further to the first embodiments, the third pixel data is previously fetched from the memory with respect to memory access commands corresponding to retrieving the fourth pixel data.

Further to the first embodiments, the memory comprises dynamic random access memory providing pixel data storage by cache line in a raster order.

In one or more second embodiments, a system for image de-warping comprises memory to store pixel data corresponding to at least a portion of an input image and an image signal processor coupled to the memory, the image signal processor comprising a first internal buffer, a second internal buffer, a microcontroller, and a distortion correction processor, the microcontroller to determine, for a current image modification region of the input image, a corresponding first region of the memory storing first pixel data corresponding to the current image modification region, to compare the first region of the memory to a second region of the memory corresponding to second pixel data of a previous image modification region of the input image to generate an overlapping region of the memory that is in both the first region and the second region, to generate a command to copy third pixel data corresponding to the overlapping region from the first internal buffer to the second internal buffer, and to generate one or more commands to retrieve fourth pixel data corresponding to a non-overlapping region of the first region from the memory to the second internal buffer, the second internal buffer to store the third and the fourth pixel data responsive to the commands, and the distortion correction processor to perform distortion correction based at least on the third and fourth pixel data in the second internal buffer to generate a portion of a distortion corrected output image.

Further to the second embodiments, the one or more commands to retrieve the fourth pixel data comprise ordered memory access commands such that the microcontroller is to determine a spatial direction corresponding to the current region of interest with respect to a coordinate system of the input image and to order the plurality of ordered memory access commands in a memory direction corresponding to the spatial direction and such that the memory direction is with respect to a coordinate system of the memory.

Further to the second embodiments, the one or more commands to retrieve the fourth pixel data comprise ordered memory access commands such that the microcontroller is to determine a spatial direction corresponding to the current region of interest with respect to a coordinate system of the input image and to order the plurality of ordered memory access commands in a memory direction corresponding to the spatial direction and such that the memory direction is with respect to a coordinate system of the memory and such that the coordinate system of the input image is aligned with a capture or presentation orientation of the input image and the coordinate system of the memory provides for storing pixel data of the input image in a layout matching the coordinate system of the input image.

Further to the second embodiments, the current image modification region corresponds to a plurality of points of a sparse distortion correction grid and a filter support region at least partially surrounding the plurality of points.

Further to the second embodiments, the current image modification region corresponds to a plurality of points of a sparse distortion correction grid and a filter support region at least partially surrounding the plurality of points and the plurality of points define a tetragon having four corner grid points and the filter support region comprises a region around the tetragon to support a 2-dimensional pixel filter.

Further to the second embodiments, the microcontroller is further to determine at least a first and a second region of interest of the input image such that each of the first and second regions of interest comprises an image region and a filter support region at least partially surrounding the image region, and to group at least the first and second of regions of interest to generate the current image modification region.

Further to the second embodiments, the microcontroller is further to determine, for a portion of a sparse distortion grid corresponding to at least the current image modification region, a local distortion measurement, to determine a region grouping factor for the portion of the sparse distortion grid based on the local distortion measurement, and to group a number of regions of interest equal to the region grouping factor to generate the current region of interest of the input image.

Further to the second embodiments, the microcontroller is further to determine, for a portion of a sparse distortion grid corresponding to at least the current image modification region, a local distortion measurement, to determine a region grouping factor for the portion of the sparse distortion grid based on the local distortion measurement, and to group a number of regions of interest equal to the region grouping factor to generate the current region of interest of the input image such that to determine the region grouping factor comprises the microcontroller to compare the local distortion measurement to at least one threshold and to provide a first region grouping factor when the local distortion measurement is greater than the threshold and a second region grouping factor greater than the first region grouping factor when the local distortion measurement is less than the threshold.

Further to the second embodiments, the third pixel data is previously fetched from the memory with respect to memory access commands corresponding to retrieving the fourth pixel data.

Further to the second embodiments, the memory comprises dynamic random access memory providing pixel data storage by cache line in a raster order.

Further to the second embodiments, the memory comprises dynamic random access memory providing pixel data storage by cache line in a raster order and the image signal processor comprises a system on a chip separate from the memory.

In one or more third embodiments, a system comprises means for storing pixel data corresponding to at least a portion of an input image in a memory, means for determining, for a current image modification region of the input image, a corresponding first region of the memory storing first pixel data corresponding to the current image modification region, means for comparing the first region of the memory to a second region of the memory corresponding to second pixel data of a previous image modification region of the input image to generate an overlapping region of the memory that is in both the first region and the second region, means for copying third pixel data corresponding to the overlapping region of the memory from a first internal buffer to a second internal buffer, wherein the first and second internal buffers are separate from the memory, means for retrieving fourth pixel data corresponding to a non-overlapping region of the first region of the memory from the memory and storing the fourth pixel data to the second internal buffer, and means for performing distortion correction based at least on the third and fourth pixel data in the second internal buffer to generate a portion of a distortion corrected output image.

Further to the third embodiments, the means for retrieving the fourth pixel data comprise means for retrieving the fourth pixel data based on a plurality of ordered memory access commands and the system further comprises means for determining a spatial direction corresponding to the current image modification region with respect to a coordinate system of the input image and means for ordering the plurality of ordered memory access commands in a memory direction corresponding to the spatial direction, wherein the memory direction is with respect to a coordinate system of the memory.

Further to the third embodiments, the system further comprises means for determining at least a first and a second region of interest of the input image such that each of the first and second regions of interest comprises an image region and a filter support region at least partially surrounding the image region and means for grouping at least the first and second of regions of interest to generate the current image modification region.

Further to the third embodiments, the system further comprises means for determining, for a portion of a sparse distortion grid corresponding to at least the current image modification region, a local distortion measurement, means for determining a region grouping factor for the portion of the sparse distortion grid based on the local distortion measurement, and means for grouping a number of regions of interest equal to the region grouping factor to generate the current image modification region.

Further to the third embodiments, the system further comprises means for determining, for a portion of a sparse distortion grid corresponding to at least the current image modification region, a local distortion measurement, means for determining a region grouping factor for the portion of the sparse distortion grid based on the local distortion measurement, and means for grouping a number of regions of interest equal to the region grouping factor to generate the current image modification region such that the means for determining the region grouping factor comprise means for comparing the local distortion measurement to at least one threshold and means for providing a first region grouping factor when the local distortion measurement is greater than the threshold and a second region grouping factor greater than the first region grouping factor when the local distortion measurement is less than the threshold.

In one or more fourth embodiments, at least one machine readable medium comprising a plurality of instructions that, in response to being executed on a computing device, cause the computing device to perform image de-warping by storing pixel data corresponding to at least a portion of an input image in a memory, determining, for a current image modification region of the input image, a corresponding first region of the memory storing first pixel data corresponding to the current image modification region, comparing the first region of the memory to a second region of the memory corresponding to second pixel data of a previous image modification region of the input image to generate an overlapping region of the memory that is in both the first region and the second region, copying third pixel data corresponding to the overlapping region of the memory from a first internal buffer to a second internal buffer, wherein the first and second internal buffers are separate from the memory, retrieving fourth pixel data corresponding to a non-overlapping region of the first region of the memory from the memory and storing the fourth pixel data to the second internal buffer, and performing distortion correction based at least on the third and fourth pixel data in the second internal buffer to generate a portion of a distortion corrected output image.

Further to the fourth embodiments, retrieving the fourth pixel data comprises retrieving the fourth pixel data based on a plurality of ordered memory access commands and the machine readable medium further comprises a plurality of instructions that, in response to being executed on the computing device, cause the computing device to perform image de-warping by determining a spatial direction corresponding to the current image modification region with respect to a coordinate system of the input image and ordering the plurality of ordered memory access commands in a memory direction corresponding to the spatial direction, wherein the memory direction is with respect to a coordinate system of the memory.

Further to the fourth embodiments, the machine readable medium further comprises a plurality of instructions that, in response to being executed on the computing device, cause the computing device to perform image de-warping by determining at least a first and a second region of interest of the input image, wherein each of the first and second regions of interest comprises an image region and a filter support region at least partially surrounding the image region and grouping at least the first and second of regions of interest to generate the current image modification region.

Further to the fourth embodiments, the machine readable medium further comprises a plurality of instructions that, in response to being executed on the computing device, cause the computing device to perform image de-warping by determining, for a portion of a sparse distortion grid corresponding to at least the current image modification region, a local distortion measurement, determining a region grouping factor for the portion of the sparse distortion grid based on the local distortion measurement, and grouping a number of regions of interest equal to the region grouping factor to generate the current image modification region.

Further to the fourth embodiments, determining the region grouping factor comprises comparing the local distortion measurement to at least one threshold and providing a first region grouping factor when the local distortion measurement is greater than the threshold and a second region grouping factor greater than the first region grouping factor when the local distortion measurement is less than the threshold.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A machine based method for attaining pixel data for image de-warping comprising:

storing pixel data corresponding to at least a portion of an input image in a memory;

determining, for a current image modification region of the input image, a corresponding first region of the memory storing first pixel data corresponding to the current image modification region;

comparing the first region of the memory to a second region of the memory corresponding to second pixel data of a previous image modification region of the input image to generate an overlapping region of the memory that is in both the first region and the second region;

copying third pixel data corresponding to the overlapping region of the memory from a first internal buffer to a second internal buffer, wherein the first and second internal buffers are separate from the memory;

retrieving fourth pixel data corresponding to a non-overlapping region of the first region of the memory from the memory and storing the fourth pixel data to the second internal buffer; and performing distortion correction based on accessing at least on the third and fourth pixel data in the second internal buffer to generate a portion of a distortion corrected output image.

2. The method of claim 1, wherein retrieving the fourth pixel data comprises retrieving the fourth pixel data based on a plurality of ordered memory access commands, the method further comprising:

determining a spatial direction corresponding to the current image modification region with respect to a coordinate system of the input image; and ordering the plurality of ordered memory access commands in a memory direction corresponding to the spatial direction, wherein the memory direction is with respect to a coordinate system of the memory.

3. The method of claim 2, wherein the coordinate system of the input image is aligned with a capture or presentation orientation of the input image and the coordinate system of the memory provides for storing pixel data of the input image in a layout matching the coordinate system of the input image.

4. The method of claim 1, wherein the current image modification region corresponds to a plurality of points of a sparse distortion correction grid and a filter support region at least partially surrounding the plurality of points.

5. The method of claim 4, wherein the plurality of points define a tetragon having four corner grid points and the filter support region comprises a region around the tetragon to support a 2-dimensional pixel filter.

6. The method of claim 1, further comprising:

determining at least a first and a second region of interest of the input image, wherein each of the first and second regions of interest comprises an image region and a filter support region at least partially surrounding the image region; and grouping at least the first and second of regions of interest to generate the current image modification region.

7. The method of claim 1, further comprising:

determining, for a portion of a sparse distortion grid corresponding to at least the current image modification region, a local distortion measurement;

determining a region grouping factor for the portion of the sparse distortion grid based on the local distortion measurement; and grouping a number of regions of interest equal to the region grouping factor to generate the current image modification region.

8. The method of claim 7, wherein determining the region grouping factor comprises:

comparing the local distortion measurement to at least one threshold; and providing a first region grouping factor when the local distortion measurement is greater than the threshold and a second region grouping factor greater than the first region grouping factor when the local distortion measurement is less than the threshold.

9. The method of claim 1, wherein the third pixel data is previously fetched from the memory with respect to memory access commands corresponding to retrieving the fourth pixel data.

10. The method of claim 1, wherein the memory comprises dynamic random access memory providing pixel data storage by cache line in a raster order.

11. A system for image de-warping comprising:

memory to store pixel data corresponding to at least a portion of an input image; and an image signal processor coupled to the memory, the image signal processor comprising a first internal buffer, a second internal buffer, a microcontroller, and a distortion correction processor, the microcontroller to determine, for a current image modification region of the input image, a corresponding first region of the memory storing first pixel data corresponding to the current image modification region, to compare the first region of the memory to a second region of the memory corresponding to second pixel data of a previous image modification region of the input image to generate an overlapping region of the memory that is in both the first region and the second region, to generate a command to copy third pixel data corresponding to the overlapping region from the first internal buffer to the second internal buffer, and to generate one or more commands to retrieve fourth pixel data corresponding to a non-overlapping region of the first region from the memory to the second internal buffer, the second internal buffer to store the third and the fourth pixel data responsive to the commands, and the distortion correction processor to perform distortion correction based at least on the third and fourth pixel data in the second internal buffer to generate a portion of a distortion corrected output image.

12. The system of claim 11, wherein the one or more commands to retrieve the fourth pixel data comprise ordered memory access commands, wherein the microcontroller is to determine a spatial direction corresponding to the current region of interest with respect to a coordinate system of the input image and to order the plurality of ordered memory access commands in a memory direction corresponding to the spatial direction, wherein the memory direction is with respect to a coordinate system of the memory.

13. The system of claim 12, wherein the coordinate system of the input image is aligned with a capture or presentation orientation of the input image and the coordinate system of the memory provides for storing pixel data of the input image in a layout matching the coordinate system of the input image.

14. The system of claim 11, wherein the current image modification region corresponds to a plurality of points of a sparse distortion correction grid and a filter support region at least partially surrounding the plurality of points.

15. The system of claim 11, wherein the microcontroller is further to determine at least a first and a second region of interest of the input image, wherein each of the first and second regions of interest comprises an image region and a filter support region at least partially surrounding the image region, and to group at least the first and second of regions of interest to generate the current image modification region.

16. The system of claim 11, wherein the microcontroller is further to determine, for a portion of a sparse distortion grid corresponding to at least the current image modification region, a local distortion measurement, to determine a region grouping factor for the portion of the sparse distortion grid based on the local distortion measurement, and to group a number of regions of interest equal to the region grouping factor to generate the current region of interest of the input image.

17. The system of claim 16, wherein to determine the region grouping factor comprises the microcontroller to compare the local distortion measurement to at least one threshold and to provide a first region grouping factor when the local distortion measurement is greater than the threshold and a second region grouping factor greater than the first region grouping factor when the local distortion measurement is less than the threshold.

18. The system of claim 11, wherein the memory comprises dynamic random access memory providing pixel data storage by cache line in a raster order.

19. The system of claim 18, wherein the image signal processor comprises a system on a chip separate from the memory.

20. At least one non-transitory machine readable medium comprising a plurality of instructions that, in response to being executed on a computing device, cause the computing device to perform image de-warping by: storing pixel data corresponding to at least a portion of an input image in a memory; determining, for a current image modification region of the input image, a corresponding first region of the memory storing first pixel data corresponding to the current image modification region; comparing the first region of the memory to a second region of the memory corresponding to second pixel data of a previous image modification region of the input image to generate an overlapping region of the memory that is in both the first region and the second region; copying third pixel data corresponding to the overlapping region of the memory from a first internal buffer to a second internal buffer, wherein the first and second internal buffers are separate from the memory; retrieving fourth pixel data corresponding to a non-overlapping region of the first region of the memory from the memory and storing the fourth pixel data to the second internal buffer; and performing distortion correction based at least on the third and fourth pixel data in the second internal buffer to generate a portion of a distortion corrected output image.

21. The machine readable medium of claim 20, wherein retrieving the fourth pixel data comprises retrieving the fourth pixel data based on a plurality of ordered memory access commands, the machine readable medium further comprising a plurality of instructions that, in response to being executed on the computing device, cause the computing device to perform image de-warping by:

determining a spatial direction corresponding to the current image modification region with respect to a coordinate system of the input image; and ordering the plurality of ordered memory access commands in a memory direction corresponding to the spatial direction, wherein the memory direction is with respect to a coordinate system of the memory.

22. The machine readable medium of claim 20, further comprising a plurality of instructions that, in response to being executed on the computing device, cause the computing device to perform image de-warping by:

determining at least a first and a second region of interest of the input image, wherein each of the first and second regions of interest comprises an image region and a filter support region at least partially surrounding the image region; and grouping at least the first and second of regions of interest to generate the current image modification region.

23. The machine readable medium of claim 20, further comprising a plurality of instructions that, in response to being executed on the computing device, cause the computing device to perform image de-warping by:

determining, for a portion of a sparse distortion grid corresponding to at least the current image modification region, a local distortion measurement;

determining a region grouping factor for the portion of the sparse distortion grid based on the local distortion measurement; and grouping a number of regions of interest equal to the region grouping factor to generate the current image modification region.

24. The machine readable medium of claim 23, wherein determining the region grouping factor comprises:

comparing the local distortion measurement to at least one threshold; and providing a first region grouping factor when the local distortion measurement is greater than the threshold and a second region grouping factor greater than the first region grouping factor when the local distortion measurement is less than the threshold.

* * * * *